United States Patent [19]
Akgulian et al.

[11] 3,916,849
[45] Nov. 4, 1975

[54] ENGINE AND HYDRAULIC PUMP ASSEMBLY

[75] Inventors: Sahag C. Akgulian, Racine; Donald G. Haffner, Glendale, both of Wis.

[73] Assignee: Jacobsen Manufacturing Company, Racine, Wis.

[22] Filed: Sept. 12, 1974

[21] Appl. No.: 505,267

[52] U.S. Cl. .......................... 123/41.31; 123/41.49
[51] Int. Cl.² ............................................ F01P 1/06
[58] Field of Search .......... 123/41.31, 41.33, 41.49, 123/41.63, 41.65, 41.66; 165/51

[56] References Cited
UNITED STATES PATENTS

| | | | |
|---|---|---|---|
| 2,341,165 | 2/1944 | Todd | 123/41.49 |
| 3,217,697 | 11/1965 | Mayr | 123/41.49 |
| 3,404,732 | 10/1968 | Mork | 123/41.31 |

FOREIGN PATENTS OR APPLICATIONS

| | | | |
|---|---|---|---|
| 885,152 | 12/1961 | United Kingdom | 123/41.31 |

Primary Examiner—Charles J. Myhre
Assistant Examiner—Daniel J. O'Connor
Attorney, Agent, or Firm—Arthur J. Hansmann

[57] ABSTRACT

An engine and a hydraulic pump assembly for a tractor having a frame and with the assembly being cushion supported on the tractor frame for vibration insulation. The engine crankshaft is drivingly connected to the pump shaft, and the engine and pump are mounted on a mounting member such that the pump is supported on the side of the engine where the engine fan draws the air over the pump prior to passing the air to the engine, for cooling the pump.

5 Claims, 2 Drawing Figures

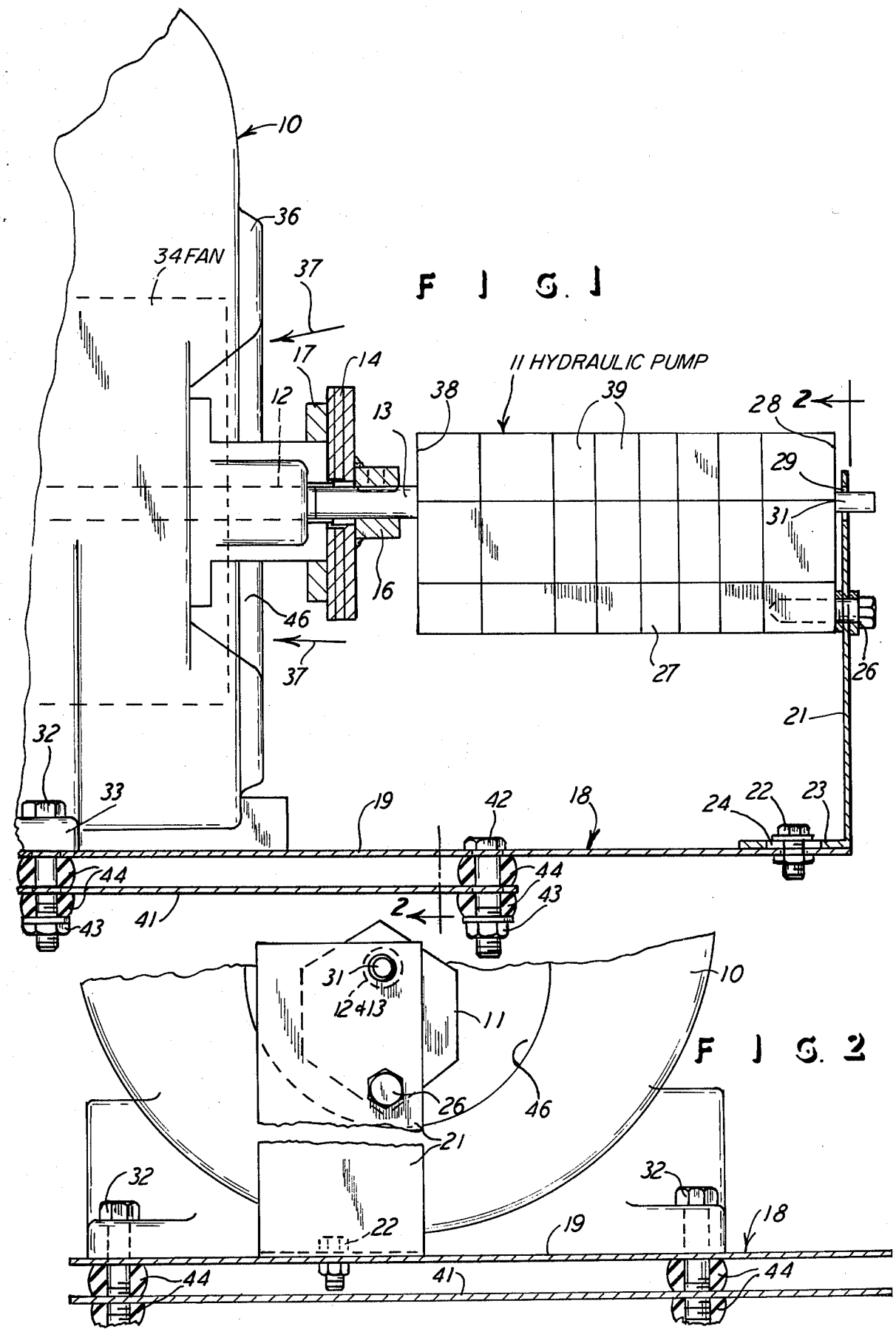

ENGINE AND HYDRAULIC PUMP ASSEMBLY

This invention relates to an engine and a hydraulic pump assembly for use in a tractor, and particularly a small type of tractor used in lawn and garden maintenance work.

BACKGROUND OF THE INVENTION

The prior art is well aware of utilizing gasoline engines for powering tractors. The tractors commonly include hydraulic apparatus consisting of a pump and hydraulic lines and hydraulic motors, all for the purpose of supplying traction power to the tractor and for operating attachments or implements on the tractor, or for like purposes. Therefore, it is a common occurrence that the hydraulic pump is driven from the power of the prime mover which is usually a gasoline engine, and the coupling of the pump to the engine is done in many conventional manners.

However, the prior art arrangements do not result in an efficient and compact assembly of the engine and the pump such that the pump can be driven directly from the engine and have the engine cooling air effective on the pump itself. Accordingly, it is a primary object of this invention to accomplish the aforementioned and to thereby have the engine cooling air pass over the hydraulic pump and thereby cool the pump itself.

Another object of this invention is to provide an engine and hydraulic pump assembly wherein the engine and pump are in a driving relationship and they are mounted in a secure and compact manner, and also the pump can be adjustably positioned relative to the engine for the purpose of securing the pump and for positioning the pump for optimum drive and for minimum vibration between the engine and the pump. Additionally, it is an object of this invention to provide a vibration-free type of mounting for the engine and pump assembly, relative to the tractor frame itself.

Therefore, the present invention provides an engine and pump assembly, and a mounting therefor, wherein the pump is cooled, though no separate or additional fan, beyond that of the engine itself, is required. Also, the assembly is compact and therefore the potential for vibration is at a minimum, and convenient provision is made for connecting the hydraulic hoses, though the compact assembly is achieved.

Other objects and advantages have become apparent upon reading the following description in light of the accompanying drawings.

BRIEF DESCRIPTION OF THE DRAWINGS

FIG. 1 is an elevational view of an embodiment of an engine and pump assembly made according to this invention, with the engine only fragmentarily shown and with parts thereof shown in section.

FIG. 2 is an end elevational view of the assembly shown in FIG. 1, and with the view being partially sectioned and viewed along the line 2—2 of FIG. 1.

DETAILED DESCRIPTION OF THE PREFERRED EMBODIMENT

This invention is useful in a lawn and garden type of tractor such as that shown in U.S. Pat. No. 3,563,012 which shows a tractor frame supporting a gasoline engine on a platform on the frame, and with a hydraulic system, including a hydraulic pump powered by the engine. That is, for background and for general information and description pertaining to this invention, reference may be had to prior patents, such as U.S. Pat. No. 3,563,012. Further, the present invention utilizes a conventional or standard type of gasoline engine, and such engine is commonly known and may be generally of the structure shown in U.S. Pat. No. 3,548,334 which shows a gasoline engine having a mounting base and having an air intake opening at one side of the engine and with the air being subject to a fan which is included in the engine, all in a conventional arrangement.

Accordingly, the present invention utilizes an engine generally designated 10 and a hydraulic pump generally designated 11. The engine 10 and pump 11 are in suitable driving relation through the conventional engine crankshaft 12 and the pump driven shaft 13 which may be connected by a conventional coupler 14. Thus, the engine crankshaft 12 drives the hydraulic pump through the drive connection with the pump driven shaft 13, and there may be a conventional type of collar 16 keyed or otherwise in driving relation with the pump shaft 13, and there may be a coupler 14 which engages the driven member 17 off the engine crankshaft 12, in any conventional arrangement.

The engine and hydraulic pump assembly of this invention also includes a mounting member, generally designated 18 and including the base piece 19 and the upstanding section or bracket 21 with the base 19 and bracket 21 being secured together by bolts, such as the bolt 22. Further, it will be seen that the bracket 21 has a foot portion 23 which has an elongated opening 24 through which the bolt 22 will extend, and thus the bracket 21 can be adjustably positioned toward and away from the engine 10, for positioning the pump 11, as desired. A mounting bolt 26 extends through the upright portion of the bracket 21 and into the housing 27 of the pump 11, for mounting the pump on the bracket 21. That is, the pump end 28 is directly connected with the bracket 21 through the screw 26, and the bracket 21 has an opening 29 through which a pump hydraulic pipe 31 can extend, for the purpose of connecting a hydraulic hose (not shown) to the pipe 31 in the usual manner of connecting a line to the hydraulic pump.

The engine 10 is mounted on and attached to the mounting member 18 by means of the mounting bolts, such as the bolts 32, which extend through openings in the base 19 of the mounting member 18. Thus, the engine 10 has the usual base flanges 33 through which the bolt 32 will extend for securing the engine in a fixed position relative to the mounting member 19. Thus, the engine 10 and pump 11 are mounted in a fixed relationship relative to each other and by means of the mounting member 18, as shown.

In this arrangement, it will be seen and understood that the pump 11 is disposed immediately adjacent to the engine 10, and in fact the engine shaft 12 and the pump shaft 13 are in close and contacting driving relationship as shown. Further, the pump 11 is disposed to the side of the engine 10 where the usual cooling air flows relative to the engine 10 for the purpose of cooling the engine. That is, the engine 10 has its conventional fan 34 mounted on the crankshaft 12 for rotation with the shaft and thereby causing air to flow into the engine shroud 36 in the direction of the arrows 37 which indicate the flow of air into the engine 10 in the conventional manner. By virtue of the mounting of the pump 11 in the path of flow of the air moving into the engine 10, the pump 11 is cooled, though no additional fan or other means are required or employed for the advantage of cooling the pump 11. Therefore, the pump 11 is shown to be of an elongated shape, and it has its end or side 38, through which the pump driven shaft 13 projects, disposed immediately adjacent to engine 10, as shown. The pump is of a multiple section type, having the various sections shown, such as those designated 39, and thus the pump is elongated in shape as shown and is of a relatively high capacity and thus the configuration and the disposition of the pump are significant in this invention.

The assembly of the engine 10 and the pump 11 with the mounting member 19 is secured to and supported on a tractor which is shown by means of a frame piece 41. The bolts 32, along with bolts, such as the bolt 42, extend through the mounting member 18 and through the tractor frame member 41, and are secured by nuts 43, for securing the mounting mentioned. Rubber or like cushion or mounting members 44 are interposed between the mounting member 18 and the tractor frame 41 so that the assembly described is insulated from vibrations to and from the tractor frame 41. In this manner, the assembly described is securely mounted but in a vibration-free arrangement. Thus, U.S. Pat. No. 3,563,012 discloses a tractor with an engine and with a hydraulic system included in the tractor, and FIG. 10 of said patent shows an arrangement of the engine crankshaft with a hydraulic pump and with other components of a hydraulic system, all of which are useful and related to the arrangement and structures described herein, and other views in said patent show the arrangement of the tractor frame for supporting the engine, such as seen in FIGS. 1 and 3 of said patent, for example.

It will further be seen and understood that the mounting member section or bracket 21 is of a span and disposition such that it will not interfere with the flow of air over the pump 11, as the air moves into the engine and in the direction of the arrows designated 37. Thus FIG. 2 shows that the bracket 21 is of a width only substantially that of the width of the pump itself, and thus air is free to flow even past the bracket 21 and across the surface of the pump 11, for efficient cooling of the pump 11 as the air moves to the intake side of the engine 10, as shown and described. Thus, the engine 10 has an air intake opening 46, arranged in a conventional manner and being substantially concentric with the engine crankshaft 12, and, the pump shaft 13 is coaxial with the engine shaft 12, as again indicated in FIG. 2.

What is claimed is:

1. An engine and a hydraulic pump assembly for a tractor having a frame, comprising an engine including a crankshaft and a fan disposed on the axis of said crankshaft for moving air over said engine, a hydraulic pump including a driven shaft coupled with said crankshaft and disposed on the axis thereof for driving said pump, a mounting member including fasteners for attaching said engine and said pump to said mounting member, said pump being disposed adjacent said engine and on the side thereof from whence said fan draws the air to move it over said engine to thereby have the air move over said pump before it moves to said engine, said pump being elongated and having its said driven shaft at one end of said pump and adjacent said engine and having said one end supported on said crankshaft, and said mounting member including a bracket connected with the other end of said pump for supporting said other end and positioning said other end furthest from said engine.

2. The engine and hydraulic pump assembly as claimed in claim 1, wherein said mounting member includes a base section and said bracket, said bracket being disposed adjacent said pump and of a span at said pump no greater than substantially that of said pump in the direction of the air flow, for assuring full and free flow of air over said pump.

3. The engine and hydraulic pump assembly as claimed in claim 2, wherein said mounting member is supported on said frame, and cushion supports interposed between said frame and said mounting member for vibration insulating said engine and said pump assembly from said frame.

4. The engine and hydraulic pump assembly as claimed in claim 1, wherein said pump includes a hydraulic connection at said other end of said pump to be spaced away from said engine.

5. The engine and hydraulic pump assembly as claimed in claim 1, wherein said mounting member is in two pieces with one piece thereof being said bracket and with the other piece thereof being cushion-supported on said tractor frame, said engine and said pump being attached to said other piece, and said bracket being adjustably supported on said other piece and connected to said pump for supporting said pump.

* * * * *